(12) United States Patent
Coyle

(10) Patent No.: US 7,228,292 B2
(45) Date of Patent: Jun. 5, 2007

(54) CARD-BASED SYSTEM AND METHOD FOR ISSUING NEGOTIABLE INSTRUMENTS

(75) Inventor: Adam Coyle, Parker, CO (US)

(73) Assignee: First Data Corporation, Englewood, CO (US)

( * ) Notice: Subject to any disclaimer, the term of this patent is extended or adjusted under 35 U.S.C. 154(b) by 819 days.

(21) Appl. No.: 10/094,372

(22) Filed: Mar. 8, 2002

(65) Prior Publication Data
US 2002/0138424 A1   Sep. 26, 2002

Related U.S. Application Data

(63) Continuation-in-part of application No. 09/713,770, filed on Nov. 16, 2000.

(51) Int. Cl.
*G06Q 40/00* (2006.01)

(52) U.S. Cl. .................. 705/39; 235/375; 235/379; 235/380; 235/381

(58) Field of Classification Search .......... 705/35–39, 705/64, 75, 77, 16, 17, 30, 33, 41, 65, 18; 235/379–381, 375; 355/77; 439/375
See application file for complete search history.

(56) References Cited

U.S. PATENT DOCUMENTS

| | | | | |
|---|---|---|---|---|
| 4,083,635 A | * | 4/1978 | Reed, Jr. ................... | 355/77 |
| 4,384,196 A | * | 5/1983 | McCumber et al. ........ | 235/375 |
| 4,385,285 A | | 5/1983 | Horst | |
| 4,699,532 A | * | 10/1987 | Smith ......................... | 400/104 |
| 4,833,312 A | * | 5/1989 | Minematsu et al. ........ | 235/379 |
| 5,014,212 A | * | 5/1991 | Smith ......................... | 700/235 |
| 5,021,967 A | * | 6/1991 | Smith ......................... | 705/18 |
| 5,119,293 A | * | 6/1992 | Hammond ................... | 705/24 |
| 5,377,271 A | * | 12/1994 | Foreman et al. ............. | 380/51 |
| 5,457,305 A | | 10/1995 | Akel et al. | |
| 5,477,037 A | * | 12/1995 | Berger ......................... | 235/379 |
| 5,477,038 A | | 12/1995 | Levine et al. | |
| 5,511,114 A | | 4/1996 | Stimson et al. | |
| 5,546,523 A | | 8/1996 | Gatto | |
| 5,570,465 A | * | 10/1996 | Tsakanikas ................. | 358/1.15 |
| 5,577,109 A | | 11/1996 | Stimson et al. | |
| 5,663,546 A | | 9/1997 | Cucinotta et al. | |
| 5,678,937 A | * | 10/1997 | Smith ......................... | 400/78 |
| 5,686,713 A | | 11/1997 | Rivera | |
| 5,721,768 A | | 2/1998 | Stimson et al. | |
| 5,993,047 A | * | 11/1999 | Novogrod et al. .......... | 700/231 |

(Continued)

FOREIGN PATENT DOCUMENTS

GB   2224874 A   *   5/1990

(Continued)

*Primary Examiner*—Narayanswamy Subramanian
(74) *Attorney, Agent, or Firm*—Townsend and Townsend and Crew LLP

(57) ABSTRACT

A system is provided for establishing uninsured accounts which can be remotely accessed by account holders to obtain access to account funds through the issuance of negotiable instruments made payable to the account holder. The account holder enters its account number and an amount requested into a dispensing station. The dispensing station communicates with an customer account server to verify sufficient funds in the account to cover the requested amount and transaction fees and prints a negotiable instrument made payable to the account holder in the amount requested, and the amount requested is debited from the account.

9 Claims, 11 Drawing Sheets

U.S. PATENT DOCUMENTS

| | | |
|---|---|---|
| 6,105,008 A | 8/2000 | Davis et al. |
| 6,119,931 A | 9/2000 | Novogrod |
| 6,149,055 A | 11/2000 | Gatto |
| 6,195,453 B1 * | 2/2001 | Simonoff .................... 382/137 |
| 6,330,544 B1 * | 12/2001 | Walker et al. ................ 705/14 |
| 6,352,201 B1 * | 3/2002 | Novogrod ................... 235/379 |
| 6,367,693 B1 * | 4/2002 | Novogrod ................... 235/379 |
| 6,439,454 B1 * | 8/2002 | Masson et al. ............. 235/375 |
| 6,478,220 B2 * | 11/2002 | Seifert et al. ............... 235/379 |
| 6,575,362 B1 * | 6/2003 | Bator et al. ................. 235/381 |
| 6,611,598 B1 * | 8/2003 | Hayosh ....................... 380/54 |
| 6,695,204 B1 * | 2/2004 | Stinson et al. .............. 235/379 |
| 6,902,518 B2 * | 6/2005 | Bretl .......................... 493/375 |

FOREIGN PATENT DOCUMENTS

JP       403001290 A  *  1/1991

* cited by examiner

CARD-BASED SYSTEM AND METHOD FOR ISSUING NEGOTIABLE INSTRUMENTS

CROSS REFERENCE TO RELATED APPLICATIONS

This application is a continuation-in-part for U.S. application Ser. No. 09/713,770, entitled, filed Nov. 16, 2000.

FIELD OF THE INVENTION

The present invention relates generally to the issuance of negotiable instruments. More specifically, the present invention relates to pre-paying funds into a transaction account and subsequently drawing upon those funds through the remote issuance of negotiable instruments.

BACKGROUND

Although most consumers rely on checking accounts, credit cards or debit cards to pay for the goods or services they purchase, many consumers lack the financial resources, credit worthiness or financial discipline to qualify for, afford, or maintain such financial services. For example, some individuals consciously avoid establishing checking accounts and the like because of an actual or perceived inability to accurately track the account balance and to avoid overdrawing the account. Such individuals may also lack the resources to maintain a sufficient balance in a checking account to avoid a monthly service charge or wish to avoid the high interest rates charged by many credit card companies. Without access to these financial services, such individuals must generally rely on cash to pay for the goods and services they utilize.

Having to rely solely on cash presents its own problems, in particular, safekeeping of the cash, the temptation to spend the cash on hand, and concerns about theft of any cash sent through the mail to pay bills. Some banks and financial institutions do offer "low cost" or "basic" savings accounts. Such financial institutions usually restrict services, offer "lower" fees, and may waive minimum balance requirements. However, such low cost accounts remain unappealing to many members of the cash based society because they tend to be offered through bank branches with limited hours and locations and ATMs which may not be local to the consumer. Furthermore, there is usually a credit check and an approval process associated with "low cost" accounts, which the cash based consumer might fail because of credit history or residence problems. In addition, the cash based consumer may be worried about garnishments or inconvenient service.

Some financial institutions offer debit card payroll solutions. For example, a branded check printing service may provide direct deposit capabilities for federal benefit checks in exchange for a transaction fee. However, federal benefit check distribution services do not allow multiple withdrawals in varied amounts. Transaction fees for these and other debit card payroll solutions tend to be expensive. There is currently no other banking service offered to the cash based society that provides direct deposit capability. In addition, such debit card accounts typically require use of a personal identification number to access funds associated with the debit card account to prevent unauthorized access to the account and unauthorized disbursement of the funds in the account. Although use of the personal identification numbers affords greater account security, many consumers avoid use of debit cards, simply because of the difficulty and inconvenience of having to remember their personal identification number along with all of the other passwords, access codes and numbers one typically has to remember.

Individuals may avoid the above-described drawbacks associated with traditional banking relationships by conducting business with Licensed Money Transmitters or entities that issue money orders. An example of a Licensed Money Transmitter is Western Union. A Licensed Money Transmitter is legally authorized to transmit funds, either by wire, facsimile, electronic transfer, courier or otherwise, within the United States or to or from locations outside the United States. A Licensed Money Transmitter may also be authorized to sell or issue checks, drafts, warrants, money orders, traveler's checks or other negotiable instruments. In some instances, a Licensed Money Transmitter may even be authorized to sell and/or exchange currency. Unlike traditional bank transactions, however, transactions handled by a Licensed Money Transmitter are not insured by the FDIC. Using a Licensed Money Transmitter, a customer can pay an agent of the Licensed Money Transmitter a selected monetary amount plus a transaction fee in exchange for a negotiable instrument payable to an entity to which the customer owes money and payable by the Licensed Money Transmitter. Using a money order or the like, the user can obtain negotiable instruments to mail to creditors instead of mailing cash. However, use of money orders does not solve the individual's problem of safekeeping his cash until needed and avoiding the temptation to spend the cash on hand.

Accordingly, there remains a need for a financial service that offers safe-storage of and access to funds, direct deposit capabilities, automated teller machine (ATM) access, convenient service points, etc, without requiring a traditional bank-customer relationship.

SUMMARY OF THE INVENTION

The present invention meets the above-described needs by providing a system and method whereby an account holding institution may remotely issue prepaid negotiable instruments to an individual without requiring a PIN. In one aspect of the invention an account structure is provided that allows an account holding institution (which may or may not be a bank or other financial institution) to provide deposit capabilities for funds representing pre-payments for negotiable instruments. An individual account is first established by the account holding institution on its host computer system or account hosting server for each participating consumer or account holder. The account holder's name and a unique account number are associated with the account, and the account has the ability to receive direct deposits of funds on behalf of the individual.

When a request by the individual for the issuance of a negotiable instrument is detected at a remote station, the remote station transmits the account number and the requested monetary amount of the negotiable instrument to the account hosting server. At the account hosting server, the account number is verified to determine that the account number identifies the account. Then, a determination is made as to whether the value of the requested negotiable instrument plus any transaction fees charged is in excess of the balance of the account. If the value of the requested negotiable instrument plus any fees charged to the account holder is not in excess of the balance of the account, the issuance of the requested negotiable instrument to the individual is authorized.

Upon authorization, an instruction is provided to the remote station or device to print one or more negotiable instruments totaling the requested amount. The remote device is also instructed to print the name of the account holder (as reflected on the account hosting server) on the negotiable instruments as the payee of the negotiable instruments. In this way, only the account holder may cash or otherwise negotiate the negotiable instruments. The requisite security is provided, in that the party cashing the negotiable instrument bears the risk if it cashes the negotiable instrument without confirming the identity of the cashing party as the payee. In another embodiment of the invention, a restrictive legend may be included on the negotiable instruments, indicating that the instrument should not be cashed or otherwise negotiated without first obtaining proper identification from the payee. In response to the issuance of the requested negotiable instrument, the balance of the account as reflected on the account hosting server is debited by the value of the requested negotiable instrument plus any fees.

In another embodiment of the invention, the account holder is provided with a card that is used to access the account. The card includes a magnetic stripe or other data storage medium onto which the account holder's account number and/or name may be encoded. The card may then be utilized at the remote station to initiate requests for the issuance of negotiable instruments. In addition, the account holder's name may be read from the magnetic stripe and used to fill in the payee information on the negotiable instruments. The card itself may also have traditional ATM and point of sale functionality through the use of an associated PIN number.

These and other aspects of the present invention will become apparent upon review of the following description with particular reference to the attached drawings.

DETAILED DESCRIPTION

Figure 1:
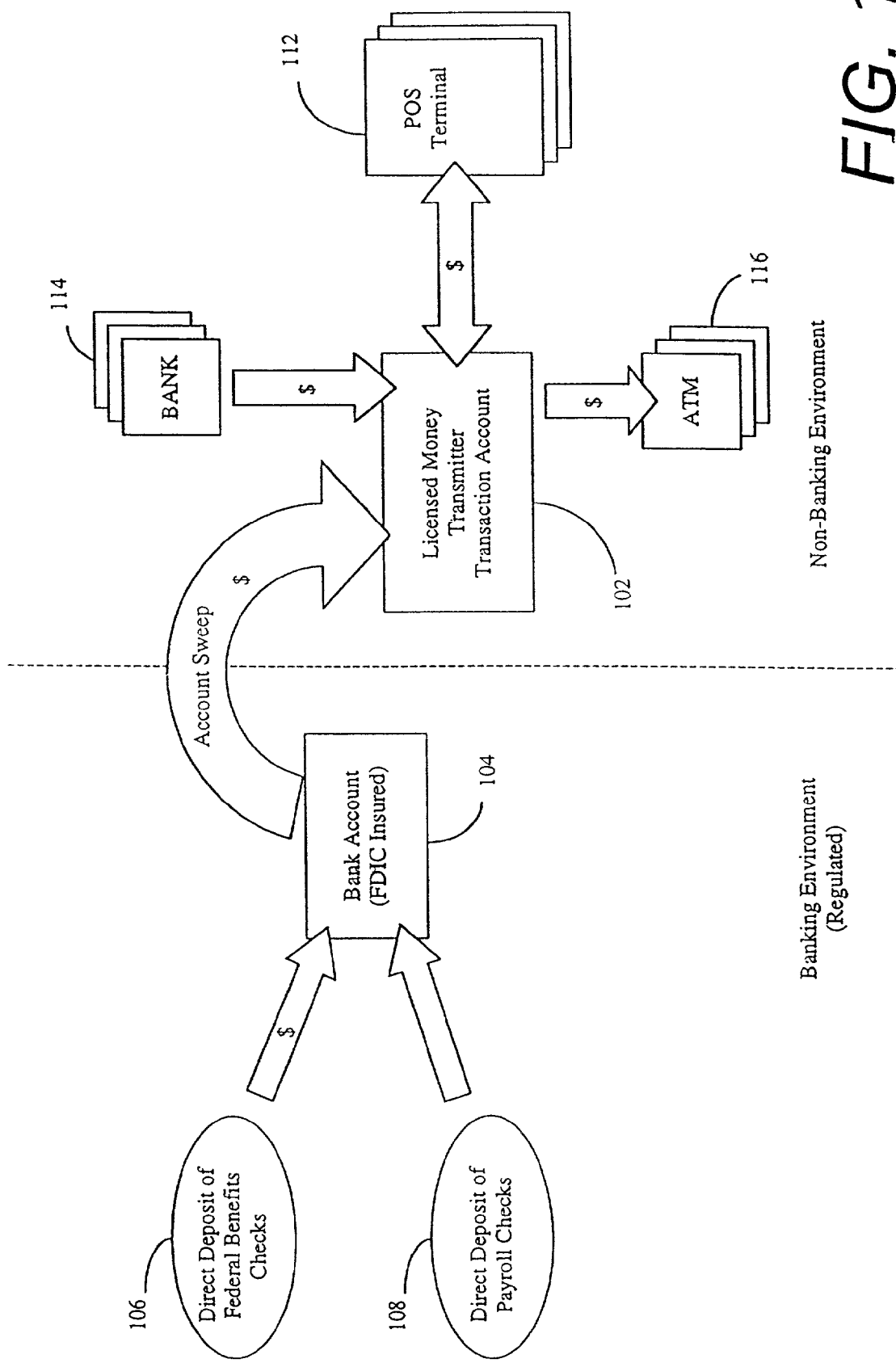
FIG. 1 is a functional block diagram illustrating the movement of funds through an exemplary account structure in an illustrative embodiment of the present invention.

The present invention comprises a system and method for a financial institution or account hosting entity to maintain customer accounts or transaction accounts in which its customers may deposit funds for safekeeping and to provide the customer remote access to the deposited funds through the issuance of negotiable instruments made payable to the account holder and drawn on the account of the financial institution to be reimbursed by funds available in the customer's account. Funds deposited in an account by a customer may generally be considered advance payments for negotiable instruments. The accounts maintained by the account hosting entity are accessible online or through a phone connection and may comprise non-interest bearing, non-FDIC insured transaction accounts. The account hosting entity may provide payment instrument and money transmission services to its cash based consumers without the need for the qualifying/approval barriers, high costs, and intricate fee and reporting obstacles associated with a traditional banking relationship. The transaction account maintained by the account hosting entity may be configured to accept deposits from a remote point of sale (POS) terminal at a retail establishment. In one embodiment, the transaction account may also be configured to indirectly accept direct deposits of funds, such as federal benefits checks and employee payroll checks.

The consumer may access his or her account or pre-paid negotiable instruments electronically via a POS terminal or an automated teller machine (ATM). Upon demand, a negotiable instrument, such as a money order, may be printed and cashed for the consumer at a POS terminal by an agent of the account hosting entity. Negotiable instruments may be printed in odd/specific amounts so that the customer may receive cash in odd/specific denominations for the purpose of paying bills, etc. Alternately, an ATM may dispense the requested cash to the consumer.

Since the transaction account maintained by the Licensed Money Transmitter is not built around the classic FDIC insured demand deposit account (DDA) structure, overall system costs, and ultimately consumer costs, are reduced. For example, because the funds deposited into the transaction account are considered as advance payments for negotiable instruments, no credit approvals are required. Also, because withdrawals from the transaction account are processed on-line and in real time, mechanisms may be provided for ensuring that there are no account overdrafts. Without overdrafts, there is no need to worry about fees attributable to an overdrawn account status.

By establishing a non-banking service that offers access to cash through retail establishments such as grocery stores or through ATMs, the present invention allows cash based consumers to avoid visitations to bank branches that may not be conveniently located. Instead, the cash based consumer may hear about the services of the present invention and receive enrollment materials at the same locations at which they conduct other financial or retail transactions, or through direct advertising. Consumers may transfer funds directly from the service desk (via a POS terminal) of a preferred retailer at a time of day that is convenient for their lifestyles. Consumers may also be provided with "VRU" or "Voice 24×7" services so as not to be made dependent only on ATMs and agents operating POS terminals.

As mentioned above, an exemplary transaction account may also be configured to indirectly accept direct deposit transactions. The transaction account is not configured to directly accept direct deposit transactions due to the desire of the cash based consumer to avoid a traditional banking relationship. Various federal regulations, which are well known to those skilled in the art, require that certain direct deposit transactions involve FDIC insured bank accounts, and the like. For example, direct deposit of federal benefits checks may only be made into traditional FDIC insured bank accounts.

Similarly, banking industry requirements require that other types of direct deposit transactions involve a traditional bank account. By way of illustration, direct deposit of payroll checks are made through an automated clearinghouse (ACH) system, which uses routing and transit (R&T) numbers and other data to effect the transfer of funds between accounts. R&T numbers are assigned exclusively to FDIC insured banks. Therefore, in order to meet the cash based consumer's demand for non-banking services, the account hosting entity may choose not to directly offer direct deposit capabilities that are subject to federal banking regulations and banking industry requirements.

The following description will hereinafter refer to the drawings, in which like numerals indicate like elements throughout the several figures. An exemplary flow of funds through an illustrative account system of the present invention is described with reference to the functional block diagram of FIG. 1. The system as shown in FIG. 1 is representative of a system adapted to accept direct deposit of federal benefits checks and employee payroll checks. As shown, a transaction account 102 is established and maintained by an account hosting entity such as a Licensed Money Transmitter or an agent thereof. The transaction account 102 may be thought of as a general account held in the name of the Licensed Money Transmitter. The general account may be divided into slub-accounts that are associated with individual consumers. Alternately, separate transaction 102 accounts may be established in the names of each individual consumer.

Due to various federal regulations and industry requirements, the transaction account 102 is not FDIC insured and is not authorized to accept funds that are transferred through the Automatic Clearinghouse (ACH) system of the federal reserve. The ACH is an electronic funds transfer system used by retail and commercial organizations. The ACH acts as a normal clearing house, receiving a transaction over the network and then splitting and routing the debit and credit portions of the transaction to the payer's and the payee's banks. Without ACH access, the transaction account 102 is not authorized to accept direct deposits of federal benefits checks, payroll checks from employers, or the like.

Accordingly, an exemplary embodiment of the present invention contemplates that a Licensed Money Transmitter will establish a communication channel with a traditional FDIC insured financial institution, such as a bank, in order to service direct deposit customers. The bank will maintain an FDIC insured bank account 104, which may either be held in the name of the Licensed Money Transmitter or in the name of an individual consumer. The bank account 104 is capable of accepting federal benefit direct deposits 106 and payroll direct deposits 108, as well as any other type of federally regulated or banking industry standardized transfer of funds. The communication channel between the Licensed Money Transmitter and the bank may allow the Licensed Money Transmitter to monitor the bank account 104 for incoming direct deposit transactions.

In an exemplary embodiment of the present invention, incoming direct deposit transactions are "swept" from the bank account 104 into the transaction account 102. In other words, funds that are deposited in the bank account 104 are instantly transferred into the transaction account 102. The instant transfer of funds avoids capitalization of the bank, i.e., no interest on the funds is accumulated. Accordingly, the communication channel between the Licensed Money Transmitter and the bank allows customers of the Licensed Money Transmitter to take advantage of direct deposit mechanisms, without themselves having to become customers of a bank. In addition, non-direct deposit funds may be deposited into the transaction account 102 via a POS terminal 112 or via any other bank 114 or financial institution.

Funds that are held in the transaction account 102 may be dispersed to the customer through a POS terminal 112 operated by an agent of the Licensed Money Transmitter, or through a traditional ATM 116. POS terminals 112 and ATMs 116 allow a consumer to conduct a transaction from remote locations. ATMs comprise computer terminals that may be configured for remote access, directly or indirectly through switching networks, to a financial account of the consumer, such as a bank account 104 or a transaction account 102. Similarly, POS devices 112 comprise computer terminals located at a merchant's place of business which allow access to a consumer's account information stored in a computer within a network of financial institutions, to permit the transfer of funds from the consumer's account to the merchant's account.

Figure 2:
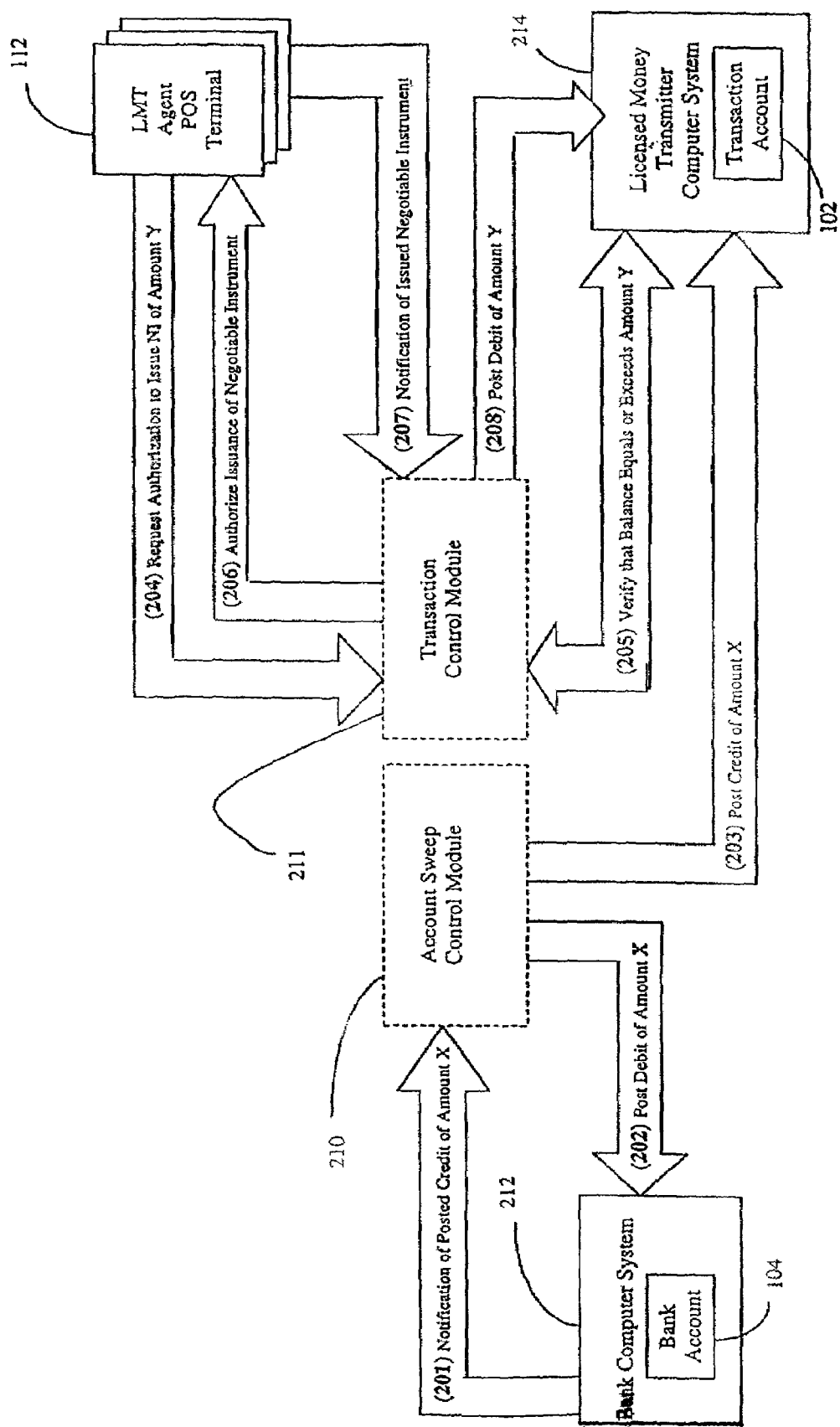
FIG. 2 is a functional block diagram illustrating the process flow of an illustrative embodiment of the present invention.

FIG. 2 illustrates the process flow of an account sweep control module 210, which may be implemented through one or more software program modules. The account sweep control module 210 facilitates communications between a bank computer system 212 and a Licensed Money Transmitter (LMT) computer system 214. In particular, the account sweep control module 210 facilitates the transfer of funds between a bank account 104 accessible by the bank computer system 212 and a transaction account 102 accessible by the Licensed Money Transmitter computer system 214. The account sweep control module 210 may be implemented as a component of the Licensed Money Transmitter computer system 214, as a component of the bank computer system 212, or as a component of a distinct computer system. The account sweep control module 210 is configured to monitor the bank account 104 in order to detect the posting of a credit to the bank account 104. As shown in step 201, an exemplary embodiment of the account sweep control module 210 receives a notification from the bank computer 212 whenever a credit is posted to the bank account 104. Methods of configuring the software and hardware of the bank computer system 212 to send a notification to the account sweep control module 210 upon the posting of a credit to the bank account 104 will be apparent to those skilled in the art.

When a notification of a posted credit is received, the exemplary account sweep control module 210 communicates with the bank computer 212 at step 202 in order to post a debit to the bank account 104. In the ideal situation, the credit of funds exists in the bank account 104 for a period of time that is on the order of a fraction of a second prior to the posting of the debit. The credit of funds posted to the bank account 104 may be in any "amount X." The subsequent debit posted by the account sweep control module 210 to the bank account 104 is in the total "amount X." Accordingly, the bank account 104 is "zeroed out" and, except for a fraction of a second or so, maintains a balance of zero. The debit is posted to the bank account 104 instantly so as to avoid capitalization of the bank.

At step 203, the exemplary account sweep control module 210 communicates with the Licensed Money Transmitter computer system 214 in order to post a credit of the total "amount X" into the transaction account 102. The transaction account 102 is a holding or escrow account that is used to store the funds of the consumer. The transaction account 102 does not accrue interest and does not function as a traditional bank account. The funds in the transaction account 102 may represent prepaid negotiable instruments that may be issued to the consumer via a POS terminal 112 operated by an agent of the Licensed Money Transmitter.

When a consumer requests the issuance of a prepaid negotiable instrument, a request for authorization to issue the negotiable instrument may be transmitted from a POS terminal 112 to a transaction control module 211. A transaction control module may be implemented through one or more software program modules. The transaction control module 211 may be implemented as a component of the Licensed Money Transmitter computer system 214, or as a component of a distinct computer system. A transaction control module 211 is configured to interact with the transaction account 102 and POS terminals 112 in order to manage transactions. By way of illustration, a POS terminal 112 may request authorization to issue a negotiable instrument of amount "Y," as shown in step 204. The transaction control module 211 accepts the request for authorization and communicates at step 205 with the Licensed Money Transmitter computer system 214 in order to verify that the balance of the transaction account 102 equals or exceeds the requested amount "Y" plus any transaction fees charged by the Licensed Money Transmitter. The transaction control module 211 may also be responsible for verifying that the customer requesting the negotiable instrument is in fact authorized to receive the negotiable instrument. For example, the customer may be required to provide a personal identification number (PIN) and an account code, which may be transmitted from the POS terminal 112 to the transaction control module 211. The transaction control module 211 may communicate with a database (not shown) hosted by the Licensed Money Transmitter computer system 214 in order to determine whether the PIN and account code provided by the customer are authentic. Additional details regarding security features of the illustrative embodiments of the present invention will be describe below.

If the balance in the transaction account 102 equals or exceeds the requested amount "Y" plus any transaction fees, the transaction control module 211 transmits to the POS terminal 112 an authorization to issue the requested negotiable instrument, as shown in step 206. However, if the balance in the transaction account 102 is less than the requested amount "Y" plus any transaction fees, the transaction control module 211 will not authorize the issuance of the requested negotiable instrument. As mentioned, the funds held in the transaction account 102 are considered to represent prepaid negotiable instruments. Therefore, the transaction account 102 will not be debited in any amount that exceeds the prepaid value of the negotiable instruments plus any transaction fees. Transaction fees may be charged at the time of the transaction so as to avoid the situation where the transaction account 102 is depleted and the customer owes a debt to the Licensed Money Transmitter. Ensuring that the transaction account 102 is never overdrawn avoiding the need to charge additional service fees associated with an overdraw account status.

After receiving authorization to issue the requested negotiable instrument, the agent of the Licensed Money Transmitter operating the POS terminal 112 prints and cashes the negotiable instrument in the amount "Y" plus any transaction fees. The agent may then retain any transaction fees and provide the remainder of the cash to the consumer. At step 207, the POS terminal 112 notifies the transaction control module 211 that the negotiable instrument has been issued. Then, at step 208 the transaction control module 211 communicated with the Licensed Money Transmitter computer system 214 in order to post a debit in the amount "Y" plus any transaction fees to the transaction account 102.

The exemplary embodiments described with respect to FIG. 1 and FIG. 2 include a two account structure (i.e., a bank account 104 and a transaction account 102) and an account sweep control module 210. It will be appreciated to those of ordinary skill in the art that the two account structure and the account sweep control module 210 are not necessary in situations where there is no desire to indirectly provide direct deposit capabilities. Various features and aspects of the present invention may be implemented in systems that do not require such direct deposit capabilities. In addition, it should be appreciated that the functionality of the account sweep control module 210 and the transaction control module 211 has been provided—by way of example only. Additional functions may be performed by either module without limitation of the scope of the present invention.

Figure 3:
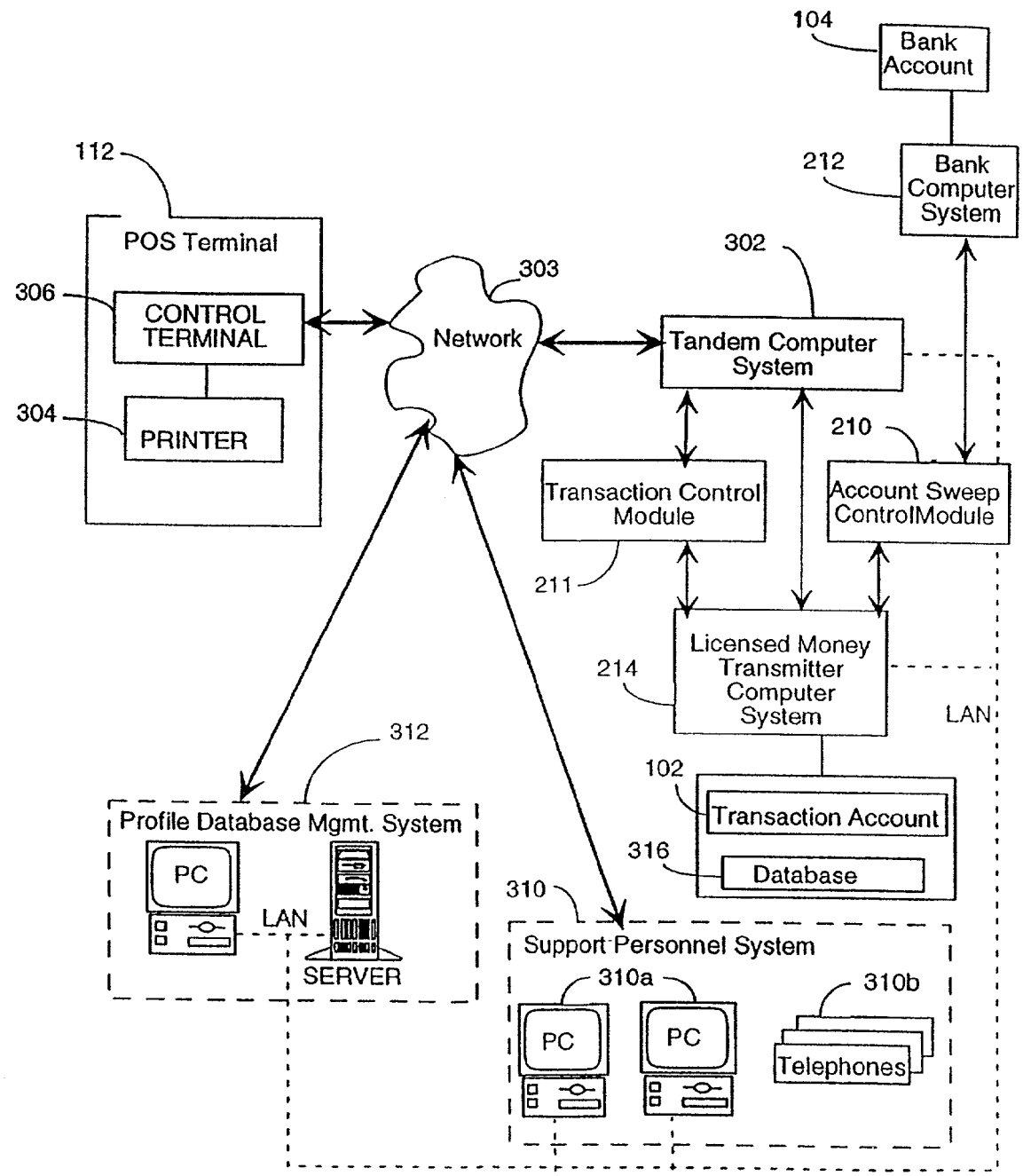
FIG. 3 is a functional block diagram illustrating an exemplary financial network environment for an illustrative embodiment of the present invention.

FIG. 3 is an overview of an exemplary Licensed Money Transmitter network environment 300 that may host a system in accordance with the illustrative embodiments of the present invention. A POS terminal 112 communicates with a Tandem computer system 302 via a network 303. The Tandem computer system 302 may be in communication with, or may comprise a part of, the Licensed Money Transmitter computer system 214. Although the functionality of a "Tandem" brand computer system is a well-known in the art, as used herein a Tandem computer system 302 may refer to any generic network server system. A POS terminal 112 generally includes a printer 304 and a control terminal 306. The control terminal 306 typically comprises a keypad or other input device, a display, a modem, a memory, and a processor. The control terminal 306 may, communicate print commands to the printer 304 via, for example, an RS-232 link or other suitable communications link. The control terminal 306 manages negotiable instrument transactions and stores data in a memory.

A profile database management system 312 may be provided for management of the POS terminals 112. In manners well known in the art, software updates and other data may be downloaded from the profile database management system 312 to a POS terminal 112. Such software updates and other data may be generated and stored in the profile database management system 312 by a Licensed Money Transmitter support personnel system 310. The Licensed Money Transmitter support personnel system 310 may include personal computers 310a operated by support personnel and telephones 310b manned by support personnel or linked to VRU systems. The Licensed Money Transmitter support personnel system 310 may be coupled to the profile database management system 312 via a local area network (LAN) or other private communications link. The Licensed Money Transmitter support personnel system 310 may also be linked to the network 303, so as to be accessible to customers via telephone systems.

At predetermined times, the control terminal 306 of the POS terminal 112 transmits its data to the Tandem computer system 302 via the network 303. The Tandem computer system 302 creates a batch file comprising data received from many POS terminals 112. The Tandem computer system 302 typically forwards batch files to the appropriate component of the Licensed Money Transmitter computer system 214 at predetermined times. For security purposes, the Tandem computer system 302 may transmit a batch file to the Licensed Money Transmitter computer system 214 via a private network or other private communications link.

The Licensed Money Transmitter computer system 214 is configured for, among other things, accessing the transaction account 102 maintained by the Licensed Money Transmitter. The transaction account 102 may be physically stored in a memory device in communication with the Licensed Money Transmitter computer system 214. The Licensed Money Transmitter computer system 214 may also host a database 316 of account codes, PINs, and other customer/account information. Such customer/account information may be used for security purposes and to monitor the nature and frequency of transactions performed by each customer.

The Licensed Money Transmitter computer system 214 may also comprise or be in communication with the account sweep control module 210. The account sweep control module 210 is in turn in communication with the bank computer system 212. The bank computer system 212 is configured for, among other things, accessing the bank account 104, which may physically be stored in a memory device in communication with the bank computer system 212.

The Tandem computer system 302 may be in communication with the transaction control module 211. Thus, communications to and from the POS terminal 112 may be routed from and to the transaction control module 211 via the Tandem computer system 302. As mentioned, the transaction control module 211 is configured to manage transactions involving deposits into and withdraws from the transaction account 102. Although shown as being a distinct network component, those skilled in the art should appreciate that the transaction control module 211 may alternately be implemented as a component of either the Tandem computer system 302 or the Licensed Money Transmitter computer system 214.

Figure 4:
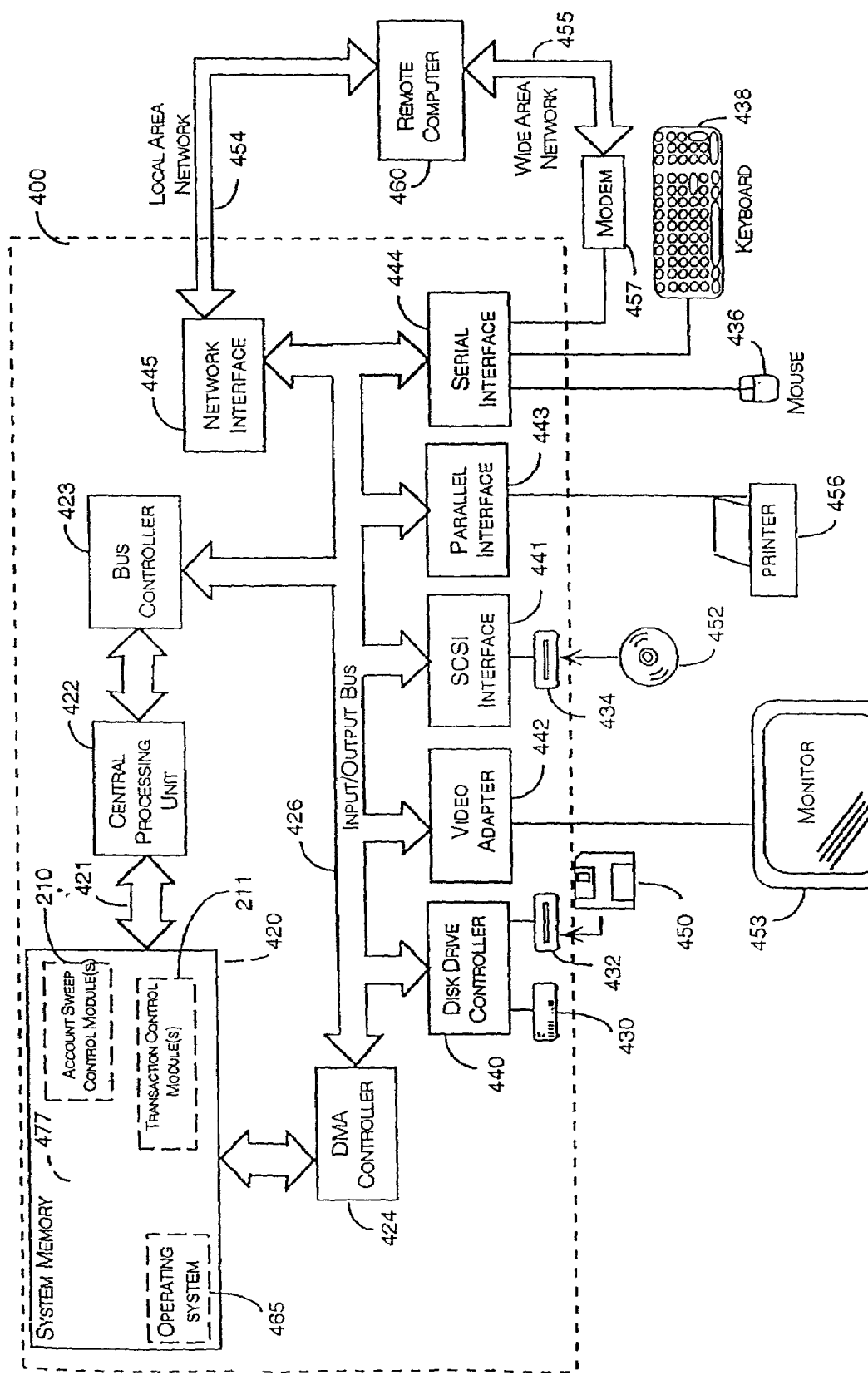
FIG. 4 is a functional block diagram of a computer system illustrating an operating environment for illustrative embodiments of the program modules of the present invention.

FIG. 4 and the following discussion are intended to provide a brief and general description of a suitable computing environment for implementing various aspects of the present invention embodied in software program modules, namely the exemplary account sweep control module 210 and the exemplary transaction control module 211. Although the system shown in FIG. 4 is a conventional computer 400, those skilled in the art will recognize that the invention also may be implemented using other types of computer system configurations. The computer 400 includes a central processing unit 422, a system memory 420, and an Input/Output ("I/O") bus 426. A system bus 421 couples the central processing unit 422 to the system memory 420. A bus controller 423 controls the flow of data on the I/O bus 426 and between the central processing unit 422 and a variety of internal and external I/O devices. The I/O devices connected to the I/O bus 426 may have direct access to the system memory 420 using a Direct Memory Access ("DMA") controller 424.

The I/O devices are connected to the I/O bus 426 via a set of device interfaces. The device interfaces may include both hardware components and software components. For instance, a hard disk drive 430 and a floppy disk drive 432 for reading or writing removable media 450 may be connected to the I/O bus 426 through a disk drive controller 440. An optical disk drive 434 for reading or writing optical media 452 may be connected to the I/O bus 426 using a Small Computer System Interface ("SCSI") 441. The drives and their associated computer-readable media provide non-volatile storage for the computer 400. In addition to the computer-readable media described above, other types of computer-readable media may also be used, such as ZIP drives or the like.

A display device 453, such as a monitor, is connected to the I/O bus 426 via another interface, such as a video adapter 442. A parallel interface 443 connects synchronous peripheral devices, such as a laser printer 456, to the I/O bus 426. A serial interface 444 connects communication devices to the I/O bus 426. A user may enter commands and information into the computer 400 via the serial interface 444 using an input device, such as a keyboard 438, a mouse 436 or a modem 457. Other peripheral devices (not shown) may also be connected to the computer 400, such as audio input/output devices or image capture devices.

A number of software program modules may be stored on the drives and in the system memory 420. The system memory 420 can include both Random Access Memory ("RAM") and Read Only Memory ("ROM"). The software program modules control the manner in which the computer 400 functions and interacts with the user, with I/O devices or with other computers. Software program modules include routines, operating systems 465, application programs, data structures, and other software or firmware components. In an exemplary embodiment, the present invention may include one or more account sweep control modules 210 and one or more transaction control modules 211. The one or more account sweep control modules 210 may comprise computer executable instructions for facilitating communications between a bank computer system 212 and a Licensed Money Transmitter computer system 214. The one or more account sweep control modules 210 may further comprise computer executable instructions for monitoring credits posted to a bank account 104, posting debits to the bank account 104 and posting credits to the transaction account 102, as previously described. The one or more transaction control modules 211 may comprise computer executable instructions for facilitating communications between a POS terminal 112 or an ATM 116 and a Licensed Money Transmitter computer system 214, as previously described.

Many or most of the software-controlled operations performed by the exemplary software program modules of the present invention are conventional and well-known in the industry. For example, it is conventional and well known to communicate standard ATM and POS messages between a computer system and an ATM network using conventional off-the-shelf ATM and POS software. In an exemplary embodiment, the computer 400 also includes such conventional software to generate and communicate appropriate messages. Conventional software packages also exist which perform a variety of exceeding complex but entirely conventional functions (e.g., maintaining audit trails to ensure transaction reliability, maintaining user account and vender files, provide clearing information, etc.). Such conventional software program modules may also be executed by the computer 400 in an exemplary embodiment. Conventional database management systems may also be executed by the computer 400 for maintaining customer/account information.

The computer 400 may operate in a networked environment using logical connections to one or more remote computers, such as remote computer 460. The remote computer 460 may be a server, a router, a peer device or other common network node, and typically includes many or all of the elements described in connection with the computer 400. In a networked environment, program modules and data may be stored on the remote computer 460. The logical connections depicted in FIG. 4 include a local area network ("LAN") 454 and a wide area network ("WAN") 455. In a LAN environment, a network interface 445, such as an Ethernet adapter card, can be used to connect the computer 400 to the remote computer 460. In a WAN environment, the computer 400 may use a telecommunications device, such as a modem 457, to establish a connection. It will be appreciated that the network connections shown are exemplary and other means of establishing a communications link between the computers may be used.

Figure 5:
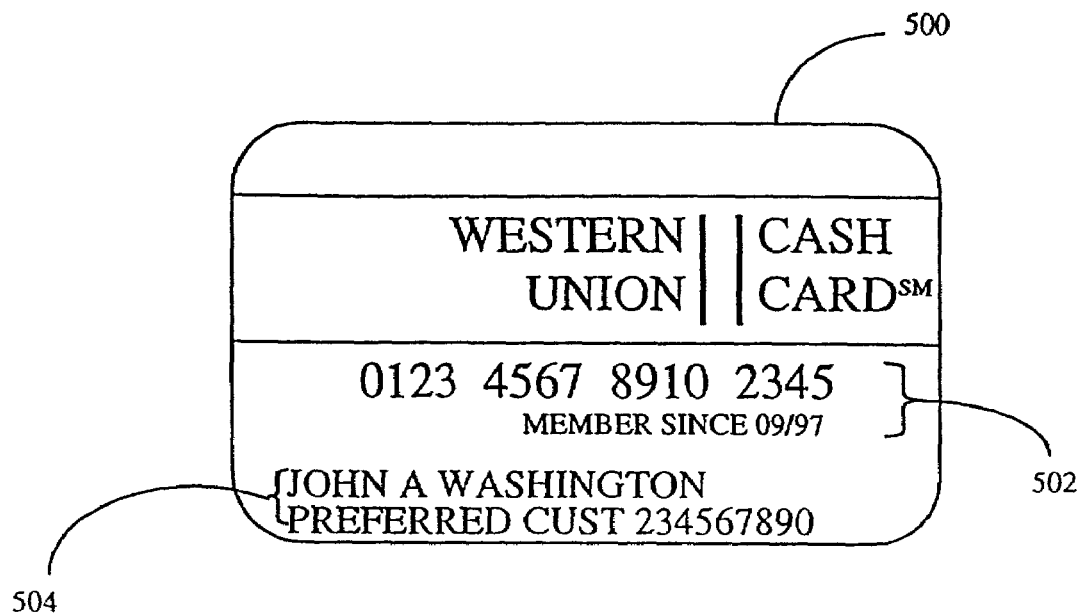
FIG. 5 is an illustration of an exemplary account card of the present invention.

Aspects of the present invention may be implemented by way of any account identifying mechanism, such as a plastic card issued to a particular consumer. As shown in FIG. 5, in an exemplary embodiment a consumer is provided with an account card or Cash Card$^{SM}$ 500 that includes identifying information on the front and an encoded magnetic strip on the reverse. Identifying information may include an account identification code 502 and a customer name and number 504. The identifying information may be used to associate a transaction account 102 or a sub-account thereof with the particular consumer.

From the consumer's point of view, funds may be loaded onto and offloaded from the Cash Card 500 at any time. Thus, the Cash Card 500 eliminates the cash based consumer's need to carry large amounts of cash on his or her person. As previously described, the consumer may authorize the deposit of funds into a transaction account 102 associated with the Cash Card 500 in various ways, such as through direct deposit transactions, POS transactions, ATM transactions, etc. Subsequently, upon presentation of an account card 500 or other account identifier and a personal identification number (PIN), the consumer may access the funds that are stored in his or her name in the transaction account 102.

To request a withdrawal of funds from the transaction account 102, a consumer may present the Cash Card 500 to an agent of the Licensed Money Transmitter operating a POS terminal 112. Alternately, the Cash Card may be presented at an ATM 116. The account identification code 502 may be read by the agent or an automated reader from the front of the Cash Card 500 or from the encoded magnetic strip on the reverse of the Cash Card 500. The account identification code 502, a PIN obtained from the consumer, and other data, such as a requested amount of funds, are transmitted to the transaction control module 211 as a request for issuance of a negotiable instrument. As described previously, the transaction control module 211 interacts with the Licensed Money Transmitter computer system 214 in order to effect an electronic transfer of funds from the transaction account 102 to the POS terminal 112 or the ATM 116 that generated the request for funds. In a similar fashion, the Cash Card 500 may be presented to an agent at a POS terminal 112, an ATM 116, or a teller at a bank 114 in order to conduct a transaction for the deposit of funds into the transaction account 102.

Accordingly, in one embodiment of the present invention, an account card 500 is issued in the name of a particular consumer upon that consumer's enrollment as a customer of the Licensed Money Transmitter. Enrollment may entail the provision of certain customer information, such as name, address, phone number, social security number, etc. For liability and/or security purposes, the Licensed Money Transmitter may require some or all of the above-listed customer information prior to providing a consumer with full privileges for depositing and withdrawing funds into and out of the transaction account 102.

Figure 6:
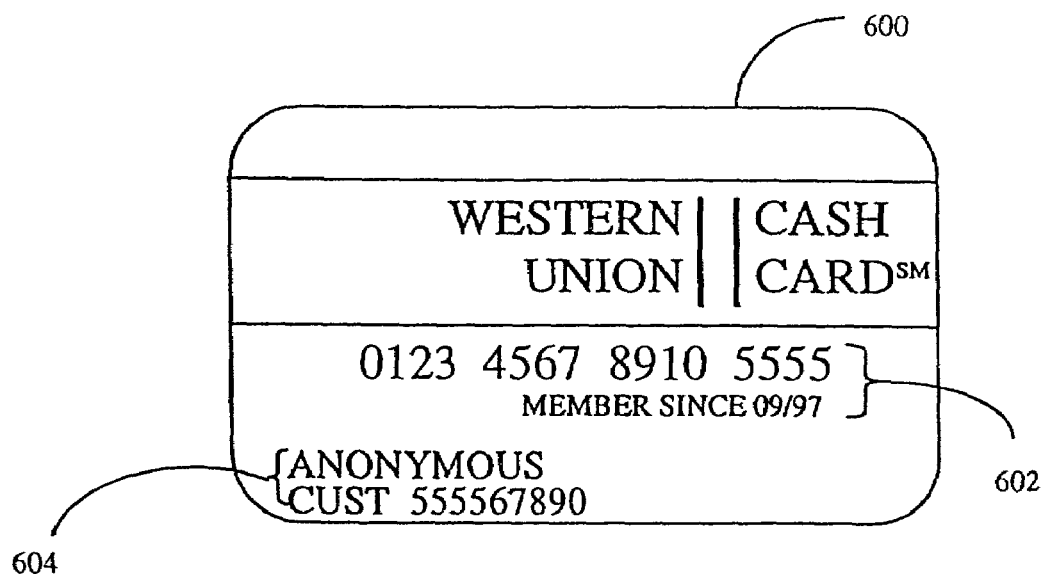
FIG. 6 is an illustration of an exemplary anonymous account card of the present invention.

As shown in FIG. 6, an alternate embodiment of the present invention involves the issuance of an anonymous account card 600. An anonymous account card 600 includes an account identification code 602 and an anonymous customer indicator 604. An anonymous account card 600 may be associated with an anonymous transaction account or an anonymous sub-account within the transaction account 102. The anonymous account is identified only by an account code and a PIN that is provided to the consumer of the anonymous account card 600. The anonymous account card 600 may be a one-load account card, meaning that funds may be deposited into the associated anonymous transaction account only one time. Once the initially loaded funds are depleted from the anonymous transaction account, the anonymous account card 600 is no longer valid (unless it is converted to a "regular" account card 500, as will be described below).

An anonymous account card 600 may be sold or otherwise provided to a consumer, who may then request that a particular amount of funds be loaded onto the anonymous account card 600. The consumer of the anonymous account card 600 is provided with a PIN, which may be used to authorize loading of the anonymous account card 600. Funds to be loaded onto the anonymous account card 600 are collected by, for example, an agent of the Licensed Money Transmitter. A credit in the amount of the collected finds is then posted to the anonymous transaction account in the manner previously described. In accordance with one embodiment of the present invention, an anonymous account card 600 may be loaded by the consumer only at a POS terminal 112. Given the anonymous nature of anonymous account card 600 transactions, no direct deposit capabilities are provided.

The funds to be loaded onto the anonymous account card 600 may be limited to specific or incremental dollar amounts. For example, it may be a policy of the Licensed Money Transmitter that no anonymous account card 600 may be loaded with more than a predetermined value. Alternately, an anonymous Account card 600 having a first load limit may be sold to consumers for a first price, while an anonymous account card 600 having a second load limit may be sold to consumers for a second price, etc. In another embodiment, an anonymous account card 600 may be pre-loaded with a particular amount of funds. In this manner, the Licensed Money Transmitter may store funds of a predetermined amount in the anonymous transaction account associated with the anonymous Account card 600. Then, the pre-loaded anonymous account card 600 may be sold to a consumer for a price equal to the predetermined amount plus any additional service fees.

As mentioned, an anonymous account card 600 may expire upon depletion of the initially loaded funds. An expired anonymous account card 600 may no longer be used by the consumer to deposit funds into or withdraw funds from a transaction account 102. However, the present invention contemplates that an anonymous account card 600 may be converted into a "regular" account card 500 that carries full reload and access privileges, including direct deposit capabilities. Conversion from an anonymous account card 600 to a regular account card 500 requires that the consumer enroll as a customer of the Licensed Money Transmitter. As mentioned above, enrollment entails providing certain customer and account specific information. Enrollment may be performed over the telephone, via the mail, or through any other suitable communications medium. When the consumer has successfully enrolled as a customer, the Licensed Money Transmitter may provide the customer with a new account card 500 and PIN. As is well known in the art, the customer may choose the PIN to be associated with his or her transaction account 102. Alternately, although less desirably, the newly-enrolled customer may continue to use the original anonymous account card 600 and the associated PIN as if it were a regular account card 500.

Figure 7:
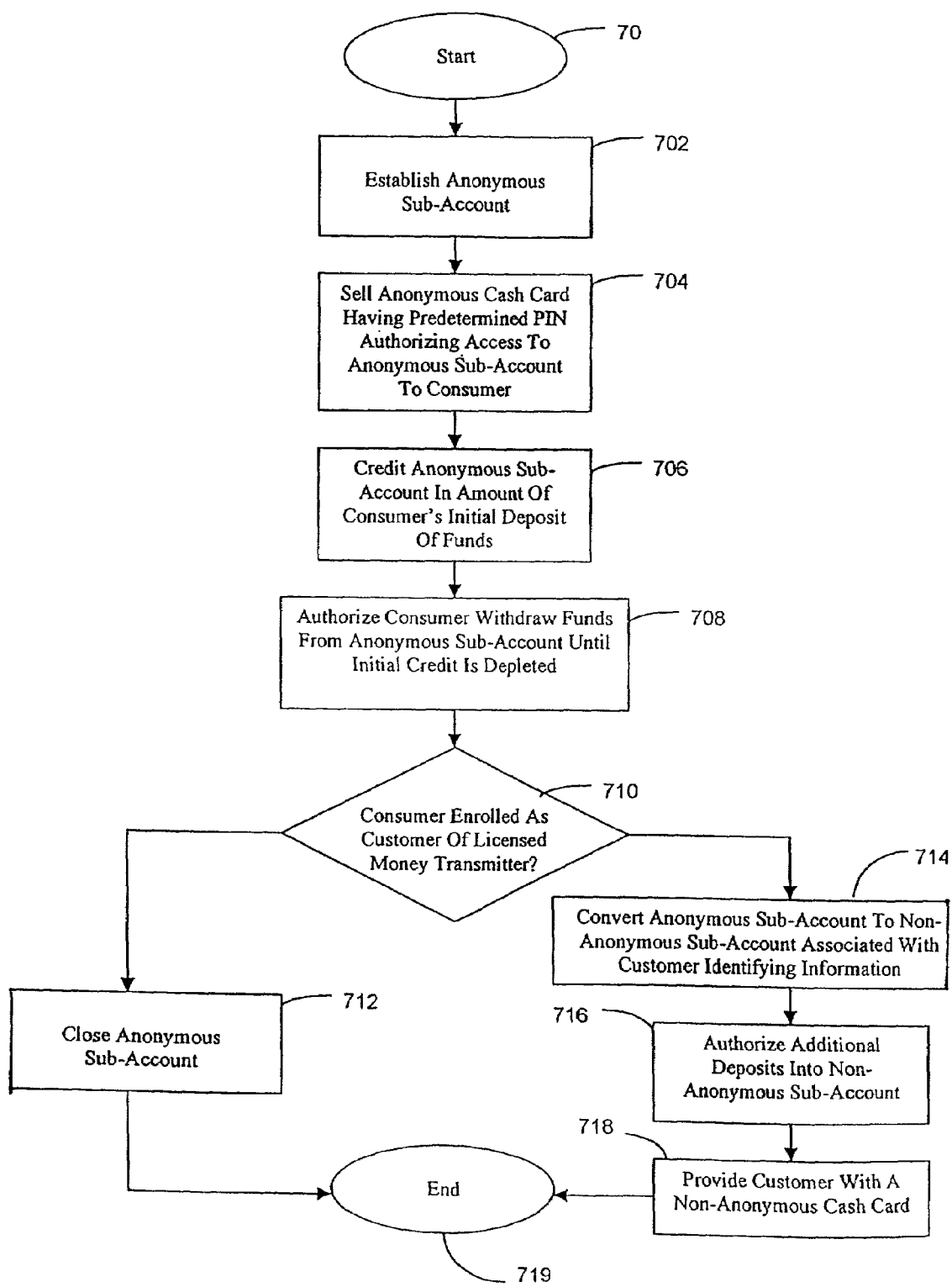
FIG. 7 is a flow diagram illustrating an exemplary method for processing transactions associated with an anonymous account card.

FIG. 7 is a flow chart illustrating an exemplary method for processing transactions associated with an anonymous account card 600. From starting block 701, the method advances to step 702 where an anonymous sub-account is established within the transaction account 102. The anonymous sub-account is identified only by an account code and is not associated with any consumer identifying information. At step 704, the anonymous account card 600 is sold to a consumer. Along with the anonymous Account card, the consumer is also provided a PIN that authorizes access to the anonymous sub-account.

The consumer may then request an initial load of the anonymous account card 600 by presenting the anonymous account card 600, PIN, and funds to an agent of the Licensed Money Transmitter. At step 706, a credit in the amount of the consumer's initial funds deposit is posted to the anonymous sub-account associated with the anonymous account card 600. Once funds are loaded onto the anonymous account card 600, the method proceeds to step 708, where withdrawals may be made until the initial funds have been depleted. At step 710 a determination is made as to whether the consumer has enrolled as a customer of the Licensed Money Transmitter. If the consumer has not enrolled, the method proceeds to step 712 where the anonymous sub-account is closed and the anonymous account card 600 is considered to be expired.

However, if the consumer has enrolled as a customer of the Licensed Money transmitter, the method proceeds to step 714, where the anonymous sub-account is converted into a non-anonymous sub-account associated with customer identifying information. Then at step 716, the non-anonymous sub-account is authorized to receive additional deposits from the customer. At step 718, the customer may be provided with a new non-anonymous account card 500 that is issued in the customer's name and has customer/account information encoded on a magnetic strip or other data storage mechanism. The method ends at step 719.

Modified Embodiment System and Method for Issuing Negotiable Instruments

Figure 8:
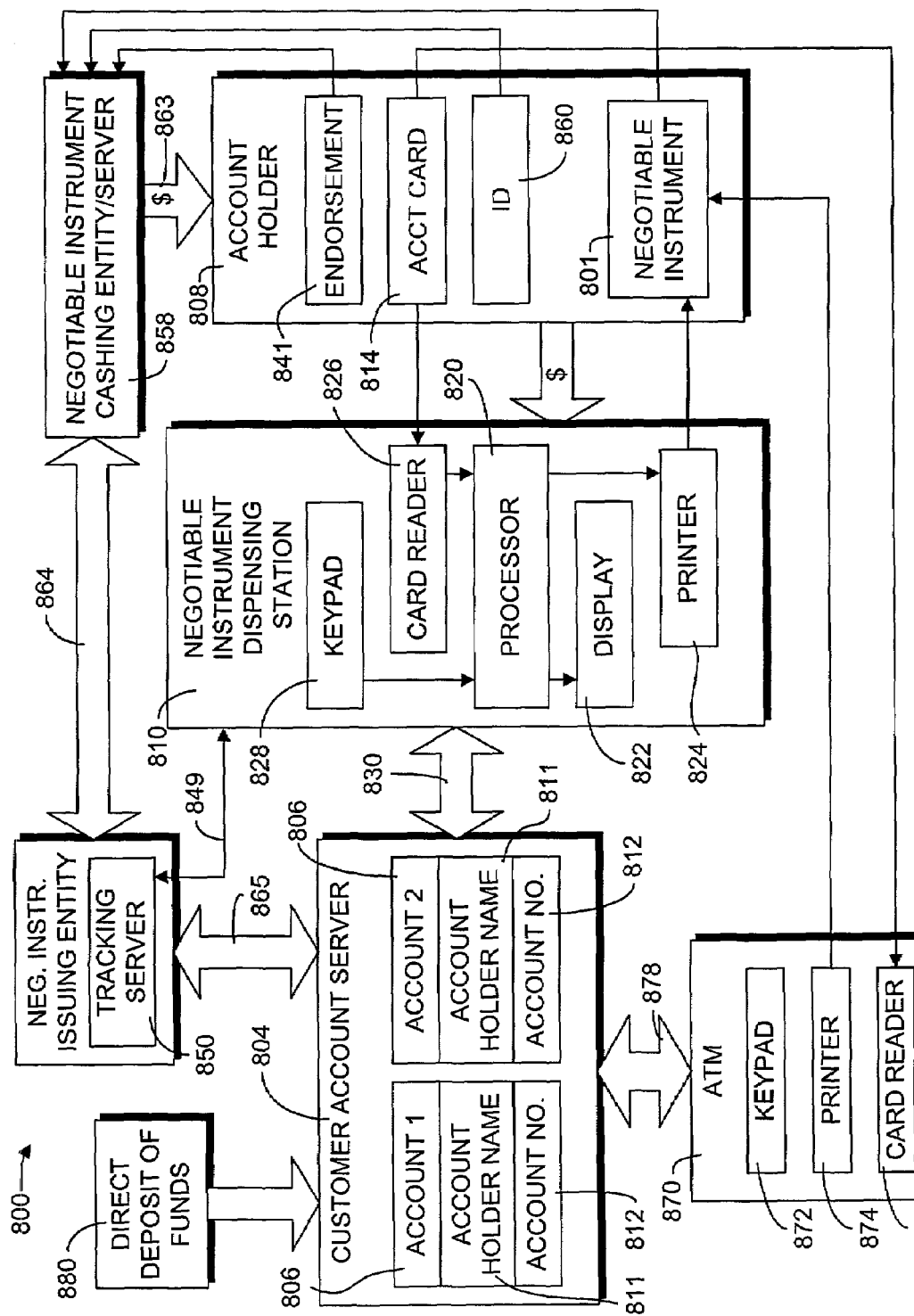
FIG. 8 is a functional block diagram illustrating a modified embodiment of the system and process for issuing negotiable instruments of the present invention.
Figure 9:
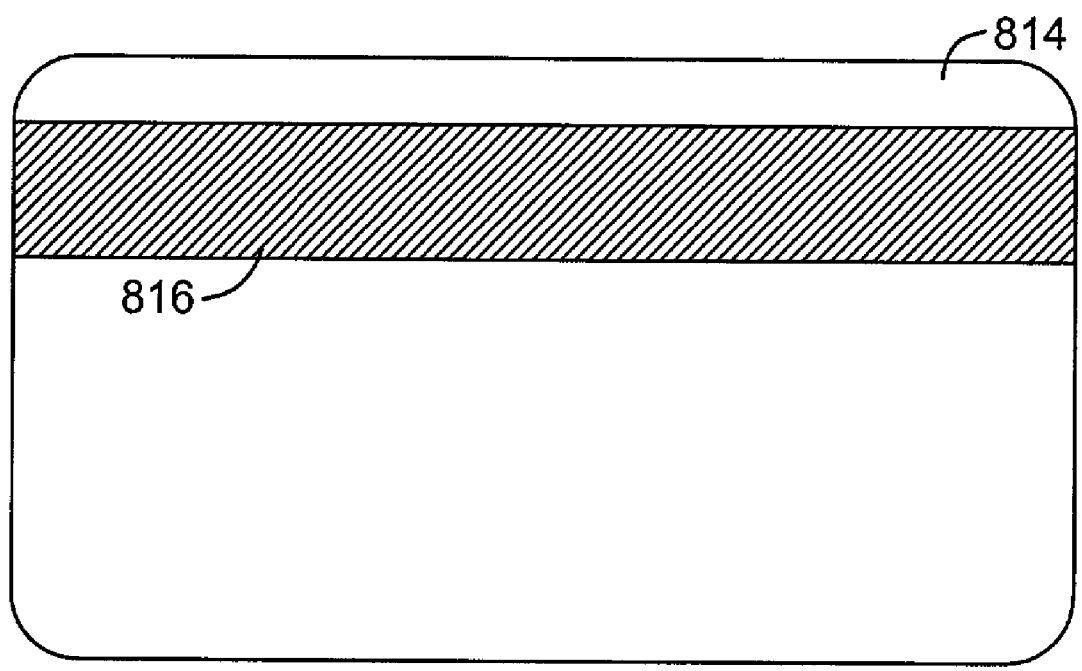
FIG. 9 is an illustration of the reverse side of an account card utilized to access an account through the process and system of the present invention.

FIG. 8 generally discloses a system 800 for issuing negotiable instruments 801 without requiring use of a PIN or signature input. It is to be understood that the negotiable instrument 801 can comprise any suitable negotiable instrument, such as a check, draft, warrant, money order, traveler's check, etc. As used herein, the term "negotiable instrument" is intended to encompass any medium of value that is similar in operation to a check, and may include instruments that are not negotiable. The system 800 includes a customer account server 804 which is established, maintained and operated by a customer account hosting entity. A plurality of customer accounts or transaction accounts 806 (two of which are shown schematically in FIG. 8) are hosted or maintained on the customer account server 804. As used herein, the terms server or computer generally include the computer processor, the related hardware and the software run thereon to provide the required functionality.

Each customer account 806 is adapted for association with an entity, such as a customer or consumer (individual, corporate, institutional, etc.), comprising an account holder 808. Negotiable instruments 801 issued using the system 800 are issued by or drawn on an account maintained by a negotiable instrument issuing entity. The negotiable instrument issuing entity and the customer account hosting entity can be a bank, credit union or other financial institution or entity such as a Licensed Money Transmitter, and one single entity or organization can perform both functions or roles.

The account holders 808 generally transact with the customer account server 804 and their accounts 806 through one of a plurality of POS terminals or negotiable instrument dispensing stations 810. However, it is foreseen that the system can also be configured to allow account holders 808 to access their accounts 806 directly through the customer account hosting entity via the customer account server 804 thus bypassing the negotiable instrument dispensing stations 810.

The account hosting entity and/or the negotiable instrument issuing entity solicit potential account holders to establish customer accounts 806 with the account hosting entity on the customer account server 804. The account holder name 811 and an account number or account identifier 812 are associated with each customer account 806 on the customer account server 804. It is to be understood that the account hosting entity will typically create customer accounts 806 in anticipation of their future association with account holders 808. The account numbers 812 and optionally, PINs can be assigned in advance of their association with account holders 808. The term "account" is to be construed broadly and interchangeably to encompass all types of financial accounts.

Upon activation of each customer account 806 by the account hosting entity, a card 814 (similar to those described above) is issued to the account holder 808. The card 813 includes a magnetic strip 816 or other data storage medium for recording on the card the account number 812 of the account holder's account 806 in machine readable format. It is foreseen that the account holder name 811 could also be recorded in machine readable format on the card 814.

The negotiable instrument dispensing station 810 is typically maintained by an agent of the negotiable instrument issuing entity and includes a computer processor 820 linked to a display 822, a printer 824 and one or more input devices such as card reader 826 and keypad 828. The computer processor 820 may also be referred to as the dispensing station processor or server. As indicated by the arrow 830, data is transferred through a communications link, such as over a phone line or the like, back and forth between the customer account server 804 of the account hosting entity and the dispensing station processor 820 of the negotiable instrument dispensing station 810. Such data transfers reflect information related to transactions (i.e., the issuance of negotiable instruments) that are initiated by the respective account holders 808 and that involve their accounts 806.

The negotiable instrument dispensing stations 810 may utilize hardware already provided to entities which issue money orders and the like. Existing money order stations generally include a computer processor linked to a display, a keypad and a printer. The processor, display and keypad are of the type used by many retailers for processing credit card or debit card transactions and can include a card reader. These stations are typically linked to a central computer system for a issuing entity to allow the dispensing agent to download to the central computer system money order serial numbers and monetary amounts of money orders issued from the dispensing station.

The keypad 828 preferably includes function keys which can be used to change the mode of operation of the computer processor 820 for the negotiable instrument dispensing station 810. Such a keypad 828 permits the dispensing station processor 820 to be programmed to allow the operator to switch between a first mode for dispensing money orders in a standard manner and a second mode for dispensing money orders or the like using the inventive system and method. In the first mode, money orders are dispensed by the agent in exchange for a cash payment by the party requesting the money order in the amount of the money order requested plus any transaction fees charged. In the inventive system and method, the amount of the money order and any transaction charges are covered by funds previously deposited in the account 806 of the account holder 808 requesting the money order.

Figure 10:
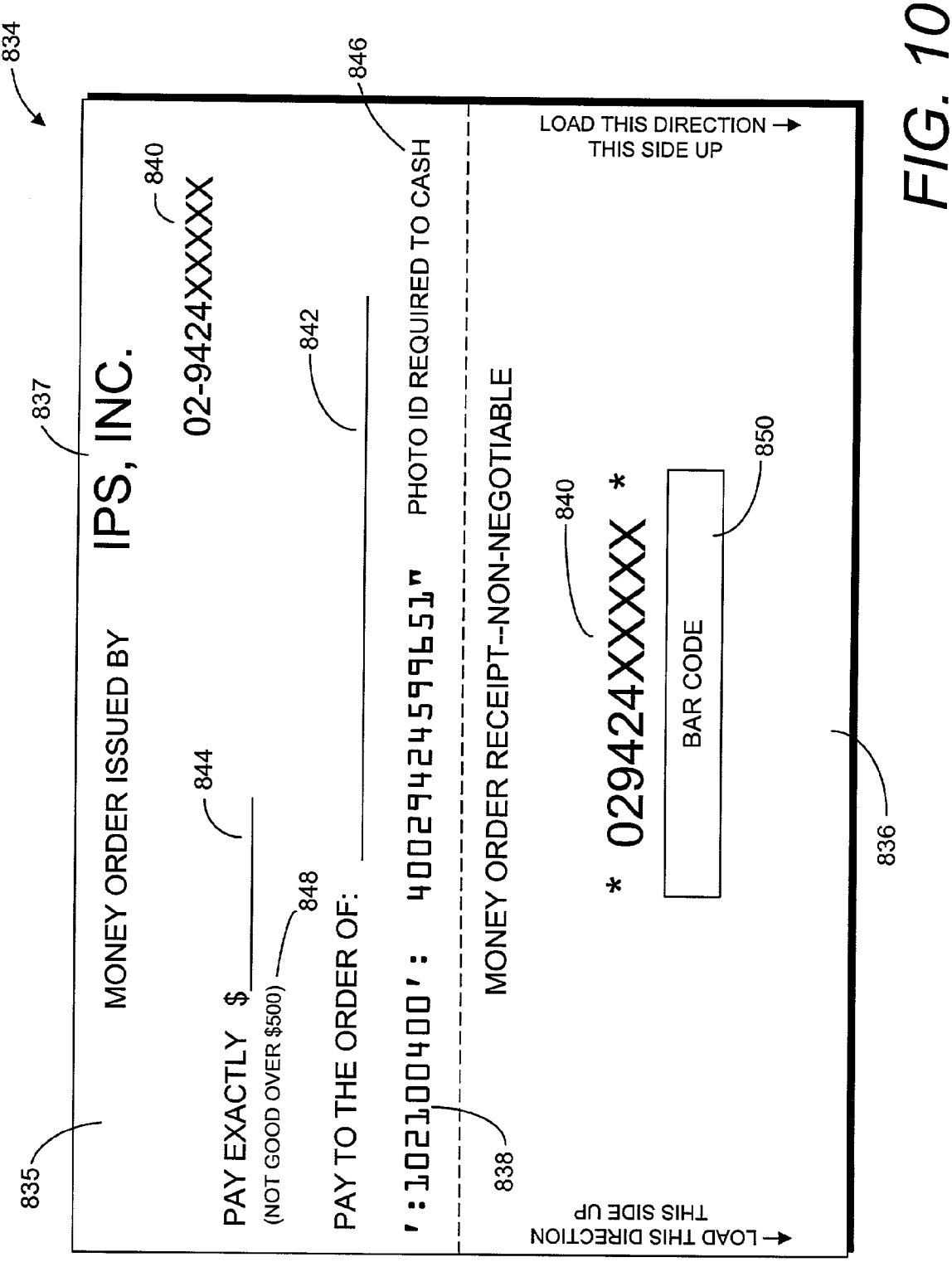
FIG. 10 is an illustration of a blank negotiable instrument used in the process and system of the present invention.

The printer 824 includes a tray or the like for storing a supply of preprinted blank negotiable instruments 801, an example of which is shown in FIG. 10. The blank negotiable instrument 801 includes a negotiable portion 835 and a receipt portion 836. The following items are pre-printed on the face of the negotiable portion 835, the name 837 of the negotiable instrument issuing entity, a routing and transit number 838 printed in a machine readable format, a negotiable instrument serial number or identifier 840, a payee blank or space 842, a payment amount space 844, a first restrictive legend 846 indicating that a photo identification will be required to cash, and a second restrictive legend 848 specifying a maximum amount in which the money order may be issued. The negotiable instrument serial number 840 is also pre-printed on the face of the receipt portion 836 as a number and in a machine readable format 850, such as a barcode.

To obtain a negotiable instrument 801 from a negotiable instrument dispensing station 810, the account holder 808 or an operator of the dispensing station 810, inputs the account number 812 into the dispensing station processor 820 either using the keypad 828 or by swiping the card 814 through the card reader 826. The account holder 808 or the operator then enters the monetary amount in which the negotiable instrument is to be issued into the processor 820 using the keypad 828. The dispensing station processor 820 then communicates with the customer account server 804 to determine the balance of funds in the customer account 806 corresponding to the account number 812 entered into the dispensing station processor 820, and to compare the balance of funds associated with the customer account 806 versus the monetary amount entered plus any transaction fees to be applied.

If the amount requested plus any transaction fees exceeds the balance of funds in the customer account 806, the customer account server 804 transmits an instruction to the dispensing station processor 820 to decline the request and to provide a message on the display 828 indicating insufficient funds in the customer account 806 to complete the transaction. It is foreseen that the keypad 828 could include a function button operable to cause the dispensing station processor 820 to obtain from the customer account server 804 and display on the display 822 the balance of funds in the customer account 806 and any applicable transaction fees.

If the amount requested plus any transaction fees does not exceed the balance of funds in the customer account 806, the customer account server 804 transmits an authorization to the dispensing station processor 820 to print and dispense the requested negotiable instrument 801. The customer account server 804 also transmits to the dispensing station processor 820 the account holder name 811 to be printed on the negotiable instrument 801, and debits the balance of funds associated with or in the customer account 806 by the monetary amount requested plus any transaction fees. The funds debited from the customer account 806 are electronically transferred to the account of the negotiable instrument issuing entity on which the negotiable instrument 801 is drawn.

Upon receipt of authorization from the customer account server 804, the dispensing station processor 820 communicates with the printer 824 causing the printer 824 to print the account holder name 811 in the payee space 842 and the monetary amount requested and authorized in payment amount space 844. Although the account holder name 811 printed on the negotiable instrument 801 is preferably obtained from the data records maintained on the customer account server 804, the account holder name 811 may be supplied from the magnetic strip or other data storage medium included on the card 814. As used herein any reference to printing or dispensing the money order or negotiable instrument can be interpreted to include the steps of printing the payee name (the account holder name 811 or other designated payees as discussed herein) and/or the monetary amount or both an a preprinted blank negotiable instrument 801.

As the negotiable instrument 801 is printed and dispensed from the printer 824, a bar code reader (not shown) in the printer 824 reads the negotiable instrument serial number 840 in the machine readable format 850 off of the negotiable instrument 801 and communicates the serial number 840 to the dispensing station processor 820 which in turn communicates the serial number 840 to the customer account server 804. The customer account server 804 associates the serial number 840 of the negotiable instrument 801 and the monetary amount of the issued negotiable instrument 801 (previously communicated to the customer account server 804) with the customer account 806 associated with the account number 812 entered to initiate the transaction. The money order serial number could also be entered into the dispensing station processor 820 using the keypad 828.

The dispensing station processor 820 keeps track of or stores information concerning the negotiable instruments 801 or money orders issued including the respective serial numbers 840, the account number 812 of the customer account 806 from which the amount payable is to be debited, the monetary amount printed on the negotiable instrument and possibly the name of the payee or account holder name 811. At preset intervals, generally nightly, this information is transferred or downloaded over a communications link 849 from the dispensing station processor 820 to a negotiable instrument tracking server 850 maintained by the negotiable instrument issuing entity. The information is transferred in response to a query issued from the negotiable instrument tracking server 850 to all of the negotiable instrument dispensing stations 810. The information transferred includes at least the serial number 840 and the monetary amount associated with each negotiable instrument 801 dispensed by or issued through the dispensing station 810 since the last transfer of information and this information is used to assist in tracking and accounting for each negotiable instrument issued.

The negotiable instrument 801, made payable to the account holder 808, can be cashed at a negotiable instrument cashing institution 858. The agents of the negotiable instrument issuing entity which dispense the negotiable instruments can also choose to serve as a negotiable instrument cashing entity 858 and cash the negotiable instruments it or other agents dispense. Security is provided by making the negotiable instrument 801 payable only to the account holder 808, who can be required to present identification 860 to the cashing entity 858. Moreover, the account holder 808 can be required to endorse the negotiable instrument 801 as generally indicated at 862. Upon presentation of the endorsed negotiable instrument 801 by the account holder 808 (payee) with proper identification 860 to the cashing entity 858, the cashing entity pays the account holder 808 cash in the monetary amount printed on the negotiable instrument 801 as generally represented by the arrow 863.

The cashing entity 858 presents the cashed negotiable instrument 801 to the negotiable instrument issuing entity through established settlement or banking channels to obtain the necessary transfer of funds to the cashing institution 858, as generally indicated by the arrow at 864. The negotiable instrument issuing entity will have already received payment of or a transfer of funds to cover the negotiable instrument from the account hosting entity to the account of the negotiable instrument issuing entity on which the negotiable instrument is drawn as discussed above and as generally represented by the arrow at 865.

It is to be understood that existing automated teller machines, such as ATM 870 could also be used as or readily modified to use as an optional source of negotiable instruments 801. The ATM includes the necessary processor (not shown), display (not shown), keypad 872, card reader 873, printer 874 and a communications link 878 to communicate with the customer account server 804. The card 814 is read by the ATM card reader 873 and the account holder 808 enters the requested amount of the negotiable instrument 801 to be issued using the keypad 872. the ATM 870 then communicates with the customer account server 804 to obtain authorization to issue the negotiable instrument 801 in the amount requested, the appropriate customer account 806 is debited and the ATM printer 874 prints a negotiable instrument 801 payable to the account holder name 811 supplied by the customer account server 804 or the card 814, in the amount requested.

Alternatively, the system could be programmed to allow issuance of cash from the ATM based upon the existence of a sufficient balance of funds in the account holder's account 806. Under this option, the ATM is programmed to provide the account holder the option of obtaining cash or a negotiable instrument 801. If the cash option is selected, the account holder 808 is required to enter a PIN number before the ATM will issue the requested cash. Upon entry of the PIN number, the ATM prompts the account holder 808 or its agent to enter, using the keypad 872, the monetary amount in which the negotiable instrument 801 is to be issued. Upon entry of the monetary amount requested, the ATM communicates with the customer account server 804 to verify the presence of sufficient funds in the customer account 806 to cover the amount requested and any transaction fees or charges. Upon receipt of such verification, customer account server debits the amount requested plus any transaction fees charged to the customer account 806 and the ATM dispenses the requested cash. Funds are later transferred from the account hosting entity to the entity maintaining the ATM 870 through traditional settlement channels as also generally indicated by the arrow 878.

It is also to be recognized that the account holder 808 could deposit funds into its customer account 806 through several methods, including a direct deposit of funds such as indicated at 880. Funds likely to be deposited directly into the customer account 806 include paychecks and federal benefits checks. It is also foreseen that deposits could be made by making payments, such as cash payments, to one of the operators of a negotiable instrument station 810. The account holder 808 could supply an amount of cash to the dispensing station operator, and enter or have entered the monetary amount provided using the keypad 828 of the dispensing station processor 820 and credit the customer account 806 by the amount supplied by the account holder 808. Such a transaction would preferably require the account holder to enter its PIN number through the dispensing station keypad 828. Similarly, deposits could be handled using an ATM that permits deposits. Confirmation of the amount deposited and accounting for the amounts deposited would then be handled using existing channels for such practices associated with ATMs.

It is foreseen that the customer account server 804 could be programmed to allow each account holder 808 to create a list of authorized payee names corresponding to regular creditors of the account holder 808 which can be stored in association with the customer account 806. The list of authorized payee names also preferably includes the account holder name 811. The customer account server 804 and the dispensing station processor 820 would then be programmed to prompt the account holder 808 or other authorized user to use the keypad or other selection means to select from the list of authorized payee names the name of the payee to be included in the negotiable instrument 801. If a name other than the account holder name 811 is selected as the payee, the program preferably requires entry of a PIN number as a condition to issuing the requested negotiable instrument made payable to the selected payee.

Figure 11A:
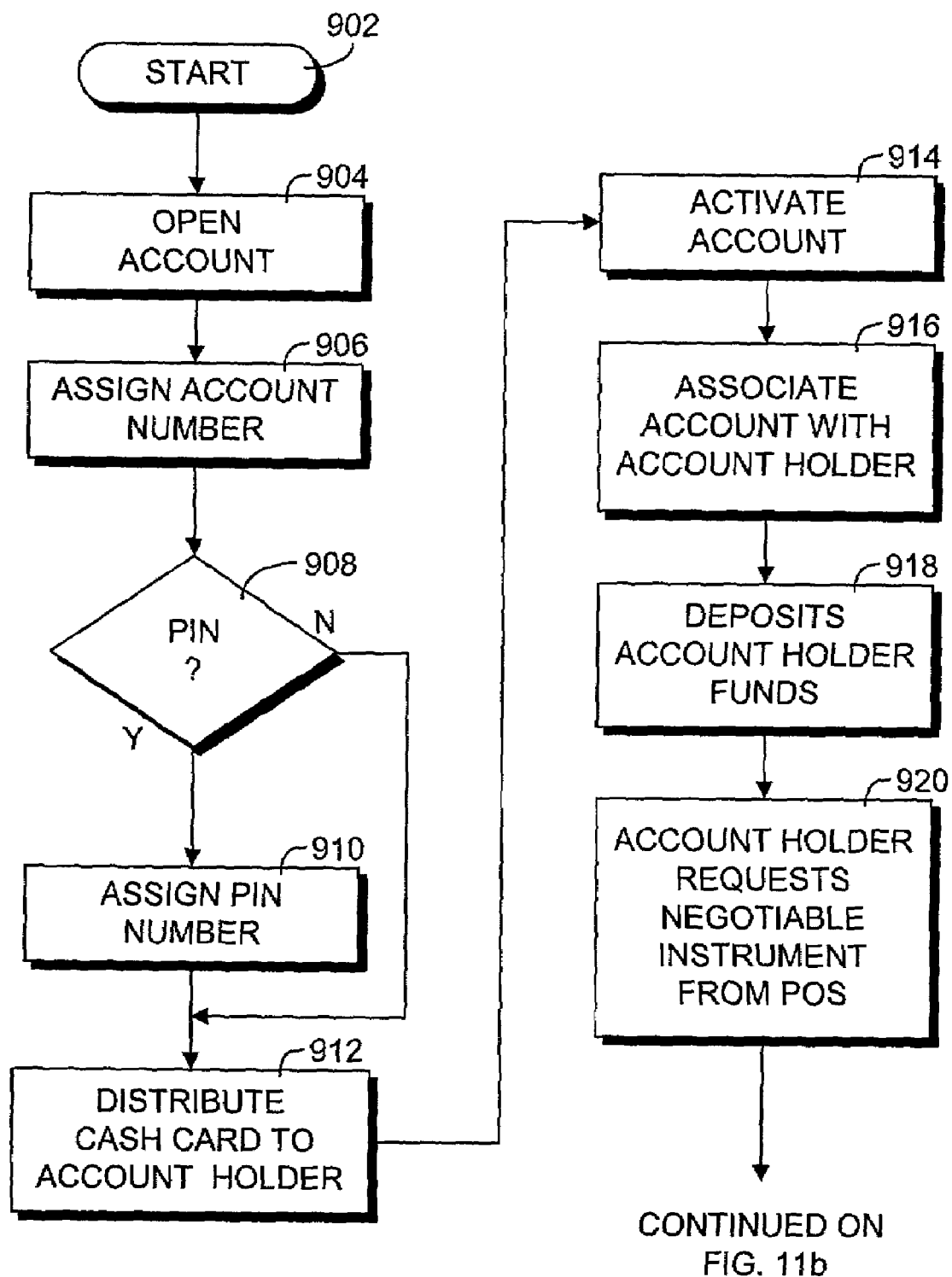
FIGS. 11a and 11b are collectively a process flow diagram illustrating the process for issuing negotiable instruments of the modified embodiment of the present invention.
Figure 11B:
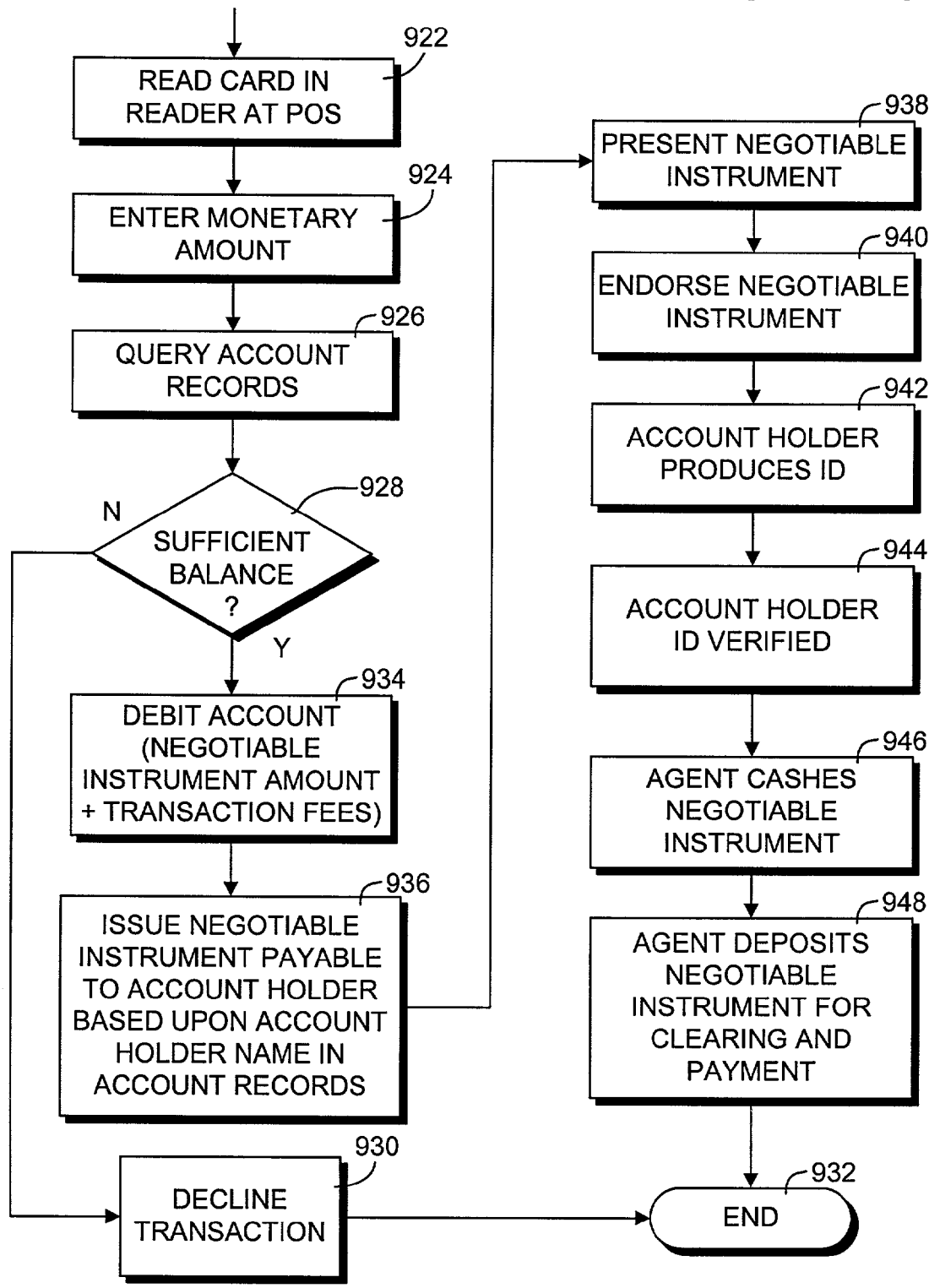

FIGS. 11a and 11b are a process diagram of the method for issuing negotiable instruments 801 generally described above. The method starts at 902 and proceeds to the opening of a customer account 806 at step 904. An account number 812 is assigned at 906. A PIN decision at 908 results in a PIN being assigned at 910 if affirmative. Otherwise, the method proceeds to step 912 whereat an account card 814 is distributed to the account holder 808. Thereafter the customer account 806 is activated at 914 and the customer account 806 is associated with the card holder/account holder 808 at 916 by the account holder name 811. Funds are deposited to the account at 918.

The account holder 808 initiates a request for a negotiable instrument at 920 by swiping the card 814 through the card reader 826 at the POS terminal or dispensing station 810 at step 922 and entering a monetary amount into the POS terminal 810 at step 924. The account records in the customer account server 804 are queried at 926 for a sufficient balance determination at 928. If negative, the method proceeds to decline the transaction at step 930 and the method proceeds to end block 932. If affirmative, the customer account 806 is debited in the amount of the negotiable instrument 801 plus any applicable transaction fees at 934. The negotiable instrument is printed and issued at step 936 payable to the account holder name 811 (or other authorized payee) in the monetary amount requested for presentation by the account holder to a negotiable instrument cashing institution at 938. The negotiable instrument 801 is endorsed at 940 and the account holder 808 produces identification at 942 whereby the account holder's identification is verified at 944 by an agent or representative of the negotiable instrument cashing institution. The agent cashes the negotiable instrument at 946 providing cash to the named payee. The agent then deposits the negotiable instrument for clearing and payment from the account hosting entity at 948. Upon clearing and payment, the method proceeds to end block 932.

From a reading of the description above pertaining to the disclosed embodiments of the present invention, modifications and variations thereto may become apparent to those skilled in the art. For example, devices other than account cards with magnetic stripes could be used to store and quickly transfer the account number 812 and account holder name 811 to the dispensing station processor 820. Such alternative devices could include smart cards including computer chips imbedded in the card. The input device in the dispensing station 810 could also comprise a receiver which communicates with a transmitter such as a cell phone through which the account holder could transmit a recorded account number and a requested monetary amount.

Other alternatives and variations may also become apparent to those of ordinary skill in the art upon a close examination of this specification in view of the drawings. It should be appreciated that many features and aspects of the present invention were described above by way of example only and are therefore not intended to be interpreted as required or essential elements of the invention. Any elements of the invention that are required or essential would have been explicitly indicated to be so, for example by describing that the element "must" be included. Therefore, the scope of the present invention is to be limited only by the following appended claims.

I claim:

1. A system for issuing negotiable instruments to account holders, comprising:
   a customer account server programmed to host an uninsured account for each account holder and to account for a balance of funds associated with each account, and programmed to associate an account identifier and an account holder name with each account;
   a plurality of negotiable instrument dispensing stations each including a dispensing station processor, a printer for printing negotiable instruments and communicating with the dispensing station processor, and at least one input device for inputting into the dispensing station processor the account identifier for one of the account holders and a monetary amount to be printed on a negotiable instrument; the dispensing station processor programmed to communicate with the customer account server to determine the balance of funds in the account associated with the account identifier input into the dispensing station processor through the input device and to instruct the printer to print the negotiable instrument payable to the account holder name and in the monetary amount input into the dispensing station processor if there is a sufficient balance of funds in the account associated with the account identifier to cover at least the monetary amount; said customer account server programmed to debit the balance of funds in the account associated with the account identifier at least by the monetary amount printed on the negotiable instrument.

2. The system as in claim 1 wherein said at least one input device includes a card reader, and a card is issued to each account holder, each card having the account identifier associated with the account holder to whom the card is issued stored in machine readable format on the card and readable by the card reader.

3. The system as in claim 2 wherein said at least one input device further includes a numeric keypad through which an account holder can enter the monetary amount into the dispensing station processor.

4. The system as in claim 1 wherein the negotiable instruments include a restrictive legend printed thereon instructing any party agreeing to cash the negotiable instrument to attempt to confirm that the person attempting to cash the negotiable instrument is the account holder whose account holder name is printed on the negotiable instrument.

5. The system as in claim 4 wherein said restrictive legend instructs the party agreeing to cash the negotiable instrument to require the person attempting to cash the negotiable instrument to present identification confirming that the person is the account holder before cashing the negotiable instrument.

6. The system as in claim 4 wherein said restrictive legend includes a maximum limit for the monetary amount of said negotiable instrument.

7. The system as in claim 1 wherein said negotiable instrument dispensing station includes a tracking identifier reader which reads a negotiable instrument tracking identifier printed on each negotiable instrument and communicates the negotiable instrument tracking identifier to the customer account server which associates the negotiable instrument tracking identifier with the account of the account holder in whose account holder name the respective negotiable instrument was issued.

8. The system as in claim 1 wherein the dispensing station processor is programmed to communicate with the customer account server to determine the balance of funds in the account associated with the account identifier input into the dispensing station processor through the input device and to instruct the printer to print the negotiable instrument payable to the account holder name and in the monetary amount input into the dispensing station processor if there is a sufficient balance of funds in the account associated with the account identifier to cover the monetary amount and any transaction fees charged to the account holder; said customer account server programmed to debit the balance of funds in the account associated with the account identifier by the monetary amount printed on the negotiable instrument and by any transaction fees charged to the account holder.

9. The system as in claim 1 wherein said customer account server is further programmed to associate a personal identification number with each account and said customer account server is programmed to require input, through the respective input device, of the personal identification number associated with the account before printing a negotiable instrument in the monetary amount requested.

* * * * *